United States Patent [19]
Kameyama et al.

[11] Patent Number: 5,713,046
[45] Date of Patent: Jan. 27, 1998

[54] LENS-FITTED PHOTOGRAPHIC FILM UNIT

[75] Inventors: Nobuyuki Kameyama; Hirofumi Katsura, both of Kanagawa, Japan

[73] Assignee: Fuji Photo Film Co., Ltd., Kanagawa, Japan

[21] Appl. No.: 708,783

[22] Filed: Sep. 9, 1996

Related U.S. Application Data

[63] Continuation of Ser. No. 317,580, Oct. 4, 1994, abandoned.

[30] Foreign Application Priority Data

Oct. 7, 1993 [JP] Japan ................................. 5-251941
Oct. 7, 1993 [JP] Japan ................................. 5-251942

[51] Int. Cl.$^6$ ................................ G03B 17/02; G03B 1/00
[52] U.S. Cl. ................................................. 396/6; 396/411
[58] Field of Search ................................. 396/440, 443, 396/535, 543, 284, 411, 401, 6

[56] References Cited

U.S. PATENT DOCUMENTS

| | | | |
|---|---|---|---|
| 1,274,223 | 7/1918 | Weis | 354/170 |
| 2,160,818 | 3/1939 | Becker | 354/170 |
| 4,318,602 | 3/1982 | Yamanaka et al. | 354/128 |
| 5,285,228 | 2/1994 | VanDeMoere | 354/219 |
| 5,367,355 | 11/1994 | Foust | 354/418 |
| 5,436,685 | 7/1995 | Yamashina | 354/202 |
| 5,452,033 | 9/1995 | Balling et al. | 354/212 |
| 5,500,705 | 3/1996 | Stephenson, III | 354/288 |
| 5,541,690 | 7/1996 | Petruchik | 354/159 |
| 5,548,364 | 8/1996 | Muramatsu et al. | 354/204 |
| 5,550,607 | 8/1996 | Mizoguchi | 354/149.11 |
| 5,576,782 | 11/1996 | Kameyama | 396/6 |
| 5,628,039 | 5/1997 | Muramatsu et al. | 396/296 |

*Primary Examiner*—Safet Metjahic
*Assistant Examiner*—Christopher E. Mahoney
*Attorney, Agent, or Firm*—Young & Thompson

[57] ABSTRACT

A lens-fitted photographic film unit has an optical viewfinder whose lens elements are held at their top side by a finder lens holding plate. The finder lens holding plate extends beyond the top side of the finder lens elements and has holes for receiving upper tips of axles for pivoting a shutter actuating lever, a frame counter dial, an arresting lever and a spring for urging the shutter actuating lever in a direction against a cocked position. The finder lens holding plates also has an arched wall which contacts a peripheral surface of a cam unit including a one-tooth gear so as to rotatably support the cam unit. The one-tooth gear is engaged with teeth formed around the periphery of the frame counter dial. The engagement between the one-tooth gear and the teeth of the frame counter dial is maintained constant by virtue of the hole and the arched wall of the finder lens holding plate.

18 Claims, 13 Drawing Sheets

LENS-FITTED PHOTOGRAPHIC FILM UNIT

This application is a continuation of application Ser. No. 08/317,580, filed Oct. 4, 1994, now abandoned.

BACKGROUND OF THE INVENTION

1. Field of the Invention

The present invention relates to a lens-fitted photographic film unit, and more particularly to a lens-fitted photographic film unit whose plastic elements are prevented from being deformed under bad circumstances such as high ambient temperature, so that the life of the reusable elements may be prolonged.

2. Related Art

Lens-fitted photographic film units (hereinafter referred to as film units) are widely known, each of which contains a photographic film cassette of ISO 135-type (ISO: 1007-1979). The film unit is mainly constituted of a main body section loading the film cassette therein and having a shutter mechanism, a taking lens, a flash unit and so forth incorporated therein, and front and rear covers which are attached to the front and rear sides of the main body section.

Because the film unit cannot be repeatedly loaded with film, after the exposure of all available frames of the contained film, the whole film unit is forwarded to a photofinisher. After the exposed film is removed to be processed for photo-printing, the empty housing of the film unit is returned to the manufacturer. The manufacturer disassembles and sorts out reusable parts of the film unit for recycling. It is desirable to reuse as many parts as possible without reprocessing, and to reassemble them into new film units.

A film unit has been disclosed in U.S. patent application Ser. No. 07/913,435 (refiled on Mar. 1, 1994, as a continuation application Ser. No. 08/203,556), most elements of which are formed from plastic resins, and whose shutter mechanism is incorporated into a separate photograph-taking unit which is removably attached to the main body section. Since the photograph-taking unit is protected from the ambient with the front cover and the main body section from the time of shipping from the factory to the time of recovery, most recovered photograph-taking units are not stained or scratched. Also the photograph-taking unit is easily removable from the main body section. Therefore, the photograph-taking unit can efficiently be reusable.

In the conventional photograph-taking unit, a shutter actuating lever and a frame counter dial are pivotally mounted on an axle and a coiled spring and an arresting lever are pivotally mounted on another axle which is spaced a predetermined distance from the first axle. A sprocket wheel and a cam unit are rotatable about the same axis disposed a predetermined distance from the first and second axles. The cam unit includes a shutter cocking cam, a notched disc and a one-tooth gear. The one-tooth gear is engaged with teeth formed around the periphery of the frame counter dial so as to advance the frame counter dial one unit per one revolution of the sprocket wheel through the one-tooth gear.

The sprocket wheel makes one revolution while the photographic film loaded in the film unit is advanced by one frame, thereby rotating the cam unit by one revolution. While the one-tooth gear advances the frame counter dial by one, the shutter cocking cam moves the shutter actuating lever to a cocked position against a strong force of the coiled spring. One end of the coiled spring is engaged with the arresting lever, and the other end is engaged with the shutter actuating lever, such that the axle of the arresting lever is urged to remove from the cam unit, and that the axle of the shutter actuating lever is urged to remove from the axle of the arresting lever. Each time the photographic film is advanced by one frame, an end of the arresting lever is trapped in the notch of the cam unit, to stop the film advancing. As a result of being trapped in the notch, the arresting lever is rotated a few amount and thus holds the shutter actuating lever in the cocked position.

For photographing, the arresting lever is released by the shutter button to rotate in a direction to remove from the shutter actuating lever and the notch of the cam unit. As a result, the shutter actuating lever rotates under the strong force of the coiled spring to a released position, striking a shutter blade in the midway to let the shutter blade swing at a constant speed.

Because the coiled spring urges the cam unit to remove from the axle of the arresting lever, the cam unit and/or the axle of the arresting lever may be plastically deformed due to the force of the spring if the film unit is left for a long time in high ambient temperature, such as in a car closed and parked in a hot sunny place. In that case, the engagement between the one-tooth gear and the teeth of the frame counter dial would get out of order, and the mechanisms would not precisely operate.

OBJECTS OF THE INVENTION

In view of the foregoing, an object of the present invention is to provide a film unit whose mechanisms except springs are made from plastic resin but are prevented from being deformed under high temperature conditions, so as to prolong the life of the reusable parts of the film unit.

SUMMARY OF THE INVENTION

To achieve the above object in a film unit having an optical viewfinder incorporated therein, the present invention provides a plate for holding lens elements of the viewfinder and having supporting portions for supporting upper portions of a cam unit and an axle which pivots a shutter actuating lever and a frame counter dial. The plate is removably attached to a top side of the photograph-taking unit. According to a preferred embodiment, the upper tip of the axle is fitted in a hole formed in the plate, and an upper peripheral surface of the cam unit is rotatably supported by an arched wall formed on the bottom side of the finder lens holding plate.

In this way, the spacing between the axle and the cam unit is maintained constant, and thus the engagement between the teeth of the frame counter dial and the one-tooth gear of the cam unit is maintained proper even if the film unit is left in high ambient temperature.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENT

Figure 1:
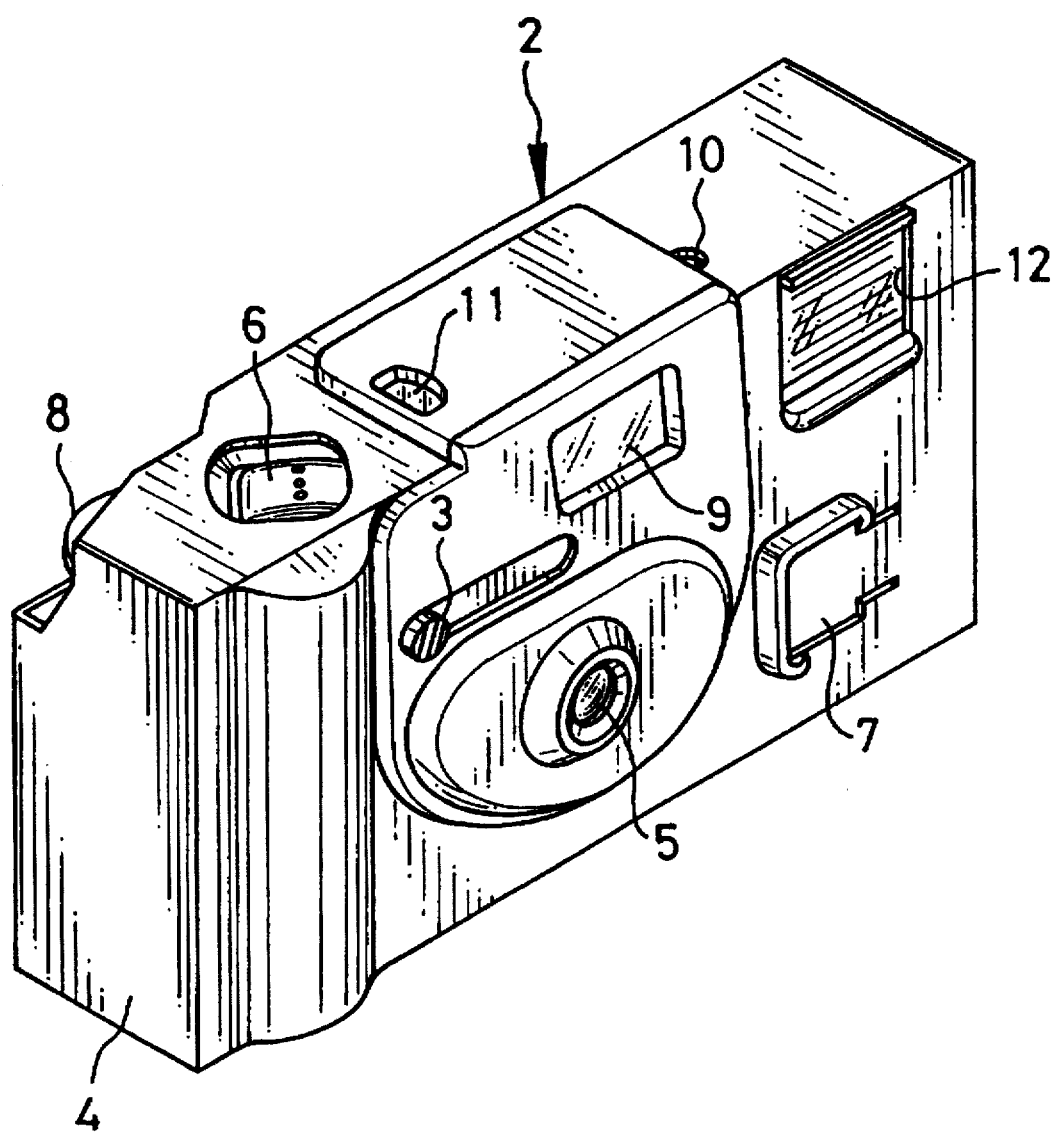
FIG. 1 is a perspective view of a film unit according to a preferred embodiment of the present invention.

A film unit 2 shown in FIG. 1 is capable of photographing a picture frame selectively in a full size (e.g., 24×36 mm, aspect ratio: 1.5) or in a panoramic size (e.g., 13×36 mm, aspect ratio: 2.8), by sliding a knob 3 to one of two corresponding switch positions. The film unit 2 is packed in an outer case 4 having openings or cutouts for exposing the knob 3, a taking lens 5, a shutter button 6, a flash charge switch 7, a film advancing wheel 8, a viewfinder 9, a charge lamp window 10, a frame number window 11, a flash window 12, and so forth to the outside.

Figure 2:
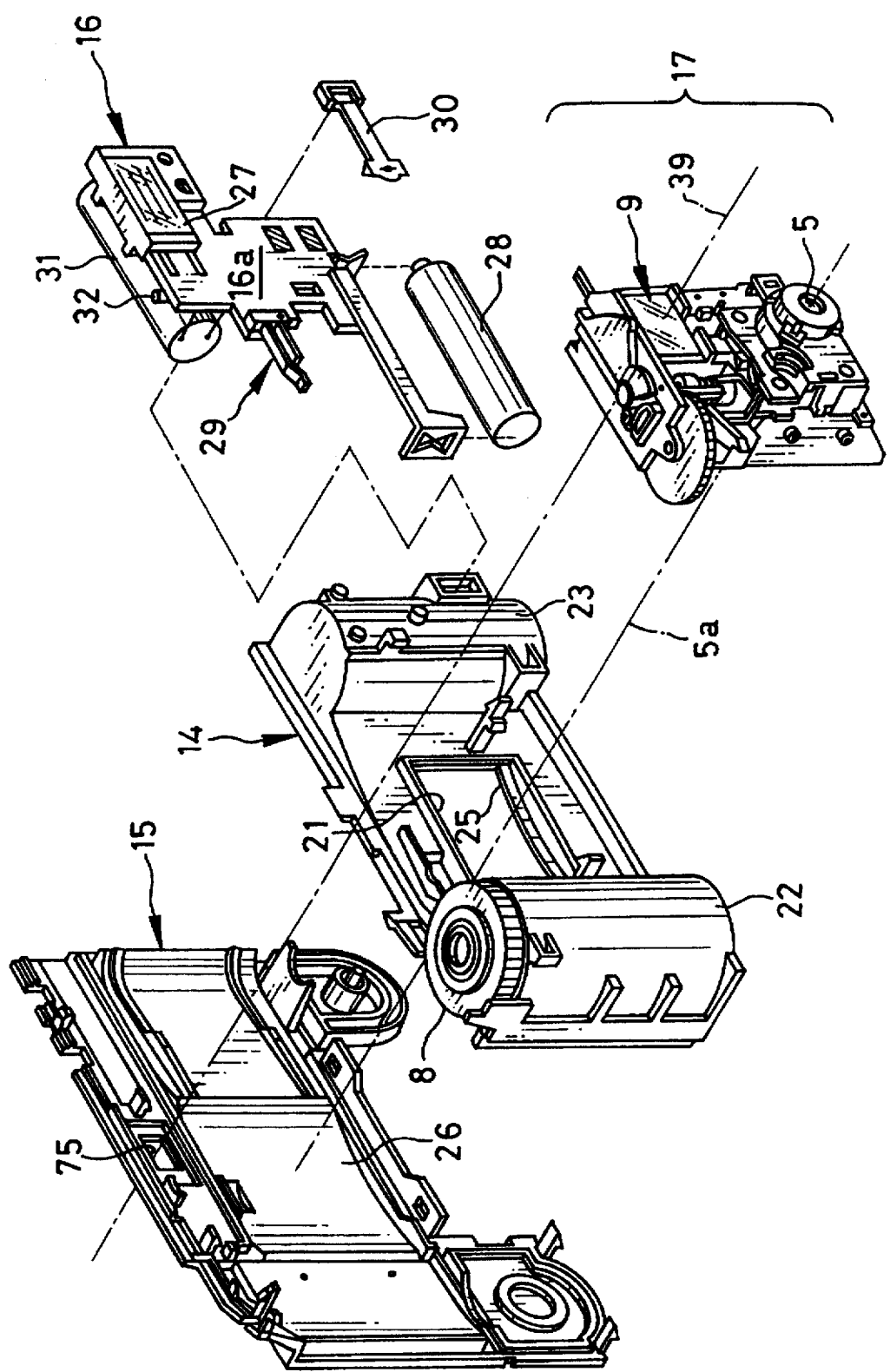
FIGS. 2 and 3 together comprise an exploded perspective view of the film unit shown in FIG. 1.
Figure 3:
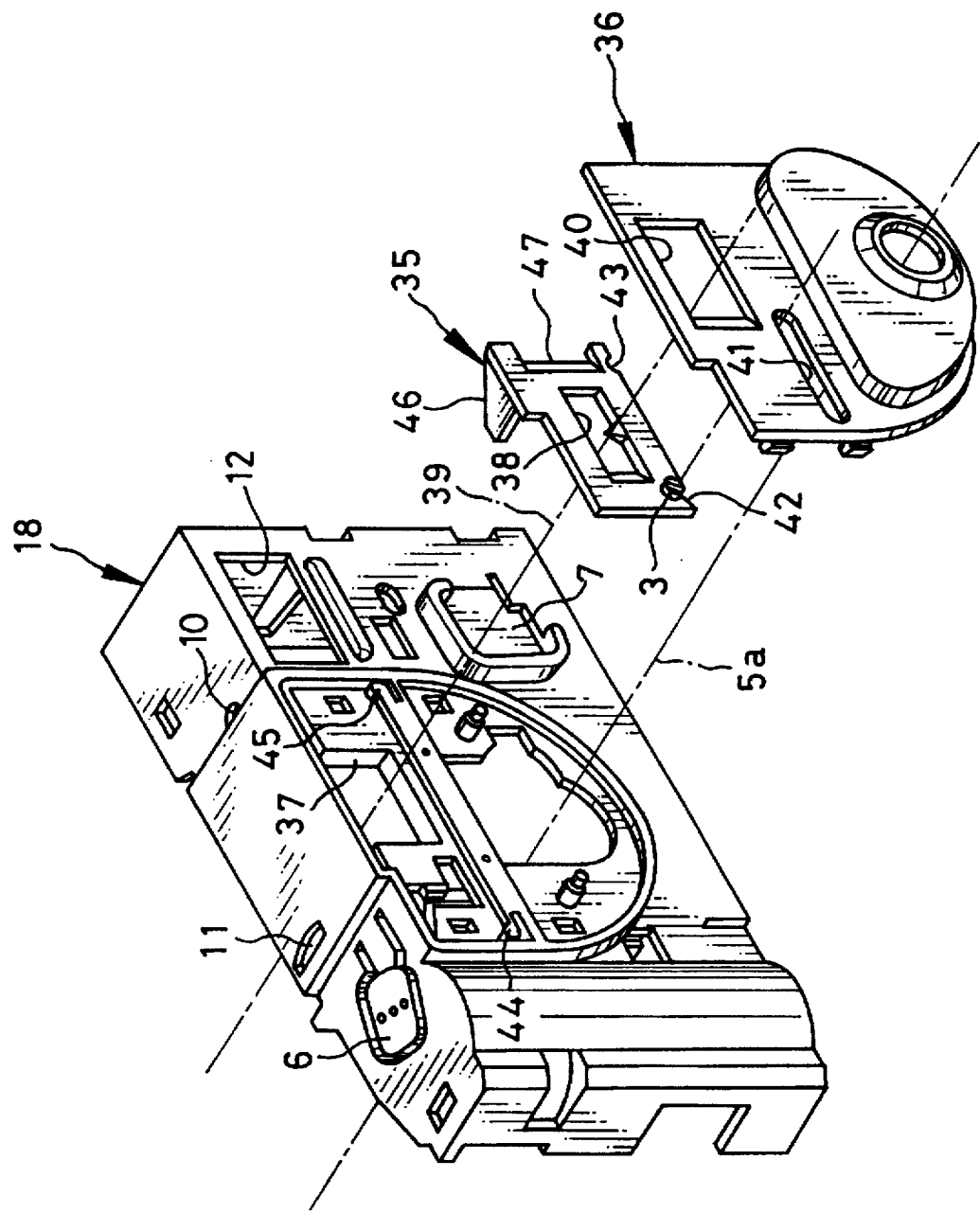
Figure 4:
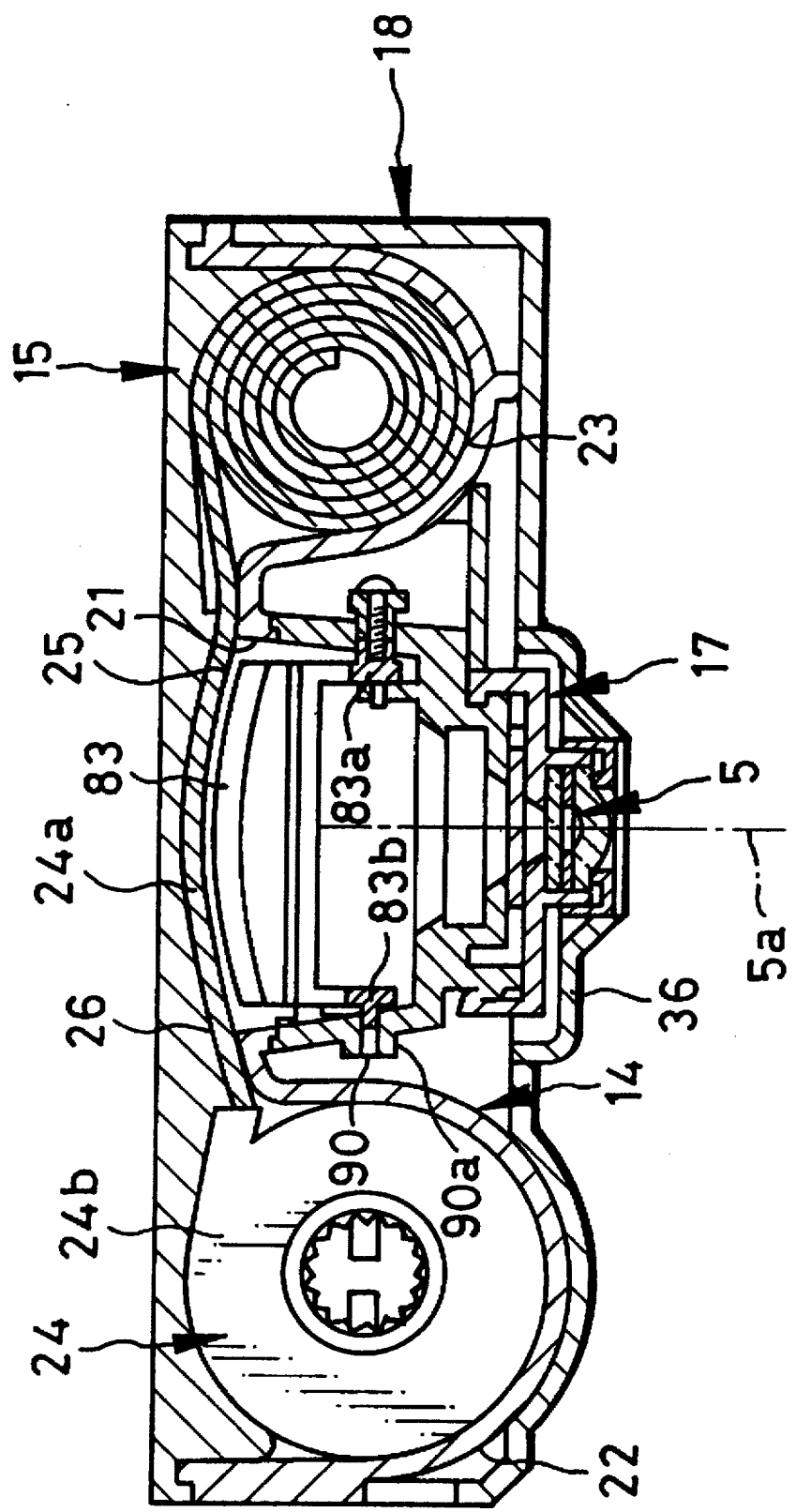
FIG. 4 is a horizontal sectional view of the film unit shown in FIG. 1.

As shown in FIGS. 2 to 4, the film unit 2 is mainly constituted of a main body section 14, a rear cover 15, a flash unit 16, a photograph-taking unit 17 and a front cover 18, which are assembled in a fashion suitable for disassembling. In the photograph-taking unit 17, a shutter mechanism including the taking lens 5, and a frame size changing mechanism (FIG. 10) are incorporated. The main body section 14, the rear cover 15 and the front cover 18 are each formed as an integral body made of opaque plastic material.

An exposure aperture 21 is formed through the main body section 14, so as to be coaxial with the taking lens 5 when the photograph-taking unit 17 is removably attached to the front of the exposure aperture 21 by claw-hole engagement or the like. A cassette chamber 22 and a film roll chamber 23 are disposed on opposite sides of the exposure aperture 21. An ISO 135-type photographic film cassette 24 loaded in the main body section 14 is shielded from ambient light by the rear cover 15, wherein a roll of unexposed photographic film 24a is held in the film roll chamber 23, and a cassette shell 24b of the photographic film cassette 24 is held in the cassette chamber 22.

The exposure aperture 21 has a size slightly larger than a full size picture frame of ISO 135-type film. A film supporting surface 25 formed on the rear side of the main body section 14 surrounding the exposure aperture 21 has a curvature so as to curve the photographic film 24a forwardly concave. A film confining surface 26 of the rear cover 15 is also curved complementarily to the curvature of the film supporting surface 25 in a portion behind the exposure aperture 21.

The flash unit 16 has a light emitting portion 27, a printed circuit board 16a, a capacitor 31, a pair of contacts 29 and a charge lamp 32. The capacitor 31 begins to be charged by a battery 28 upon depression of a metal contact plate 30 through a resilient charge switch 7 which is formed integrally with the front cover 18. When the capacitor 31 is fully charged, the charge lamp 32 lights intermittently, and this can be seen through the charge lamp window 10 formed in the top of the front cover 18. The light emitting portion projects light through the flash window 12 in response to a trigger signal which is applied when the contacts 29 is turned on in cooperation with a shutter release.

The front cover 18 has the flash window 12, the shutter button 6, a finder objective window 37, and other elements which are integrally formed therewith, and a panoramic finder mask 35 and a cover panel 36 are attached to the front cover 18. The finder mask 35 has a panoramic window 38 which limits the field of view of the viewfinder 9 to the same aspect ratio as a panoramic size frame. The knob 3 is formed integrally with the finder mask 35. The cover panel 36 has an opening 40 formed coaxially with an optical axis 39 of the viewfinder 9, for defining the full size field of view. The cover panel 36 also has a slot 41 in which the knob 3 is engaged.

By sliding the knob 3 along the slot 41, the finder mask 35 is slidable between a panoramic position where the panoramic window 38 is coaxial with the finder optical axis 39, and a full size position where the finder mask 35 is retracted from the field of view of the viewfinder 9. Notches 42 and 43 formed in both ends of the bottom edge of the finder mask 35 are fitted on resilient clicks 44 and 45 formed integrally with the front cover 18, in the full size position and the panoramic position, respectively. The finder mask 35 also has a cam 46 through which the movement of the finder mask 35 is transmitted to the frame size changing mechanism 19. The right edge 47 of the finder mask 35 is cut off so as to minimize the stroke of the finder mask 35 without interfering with the field of view in the full size position.

Figure 5:
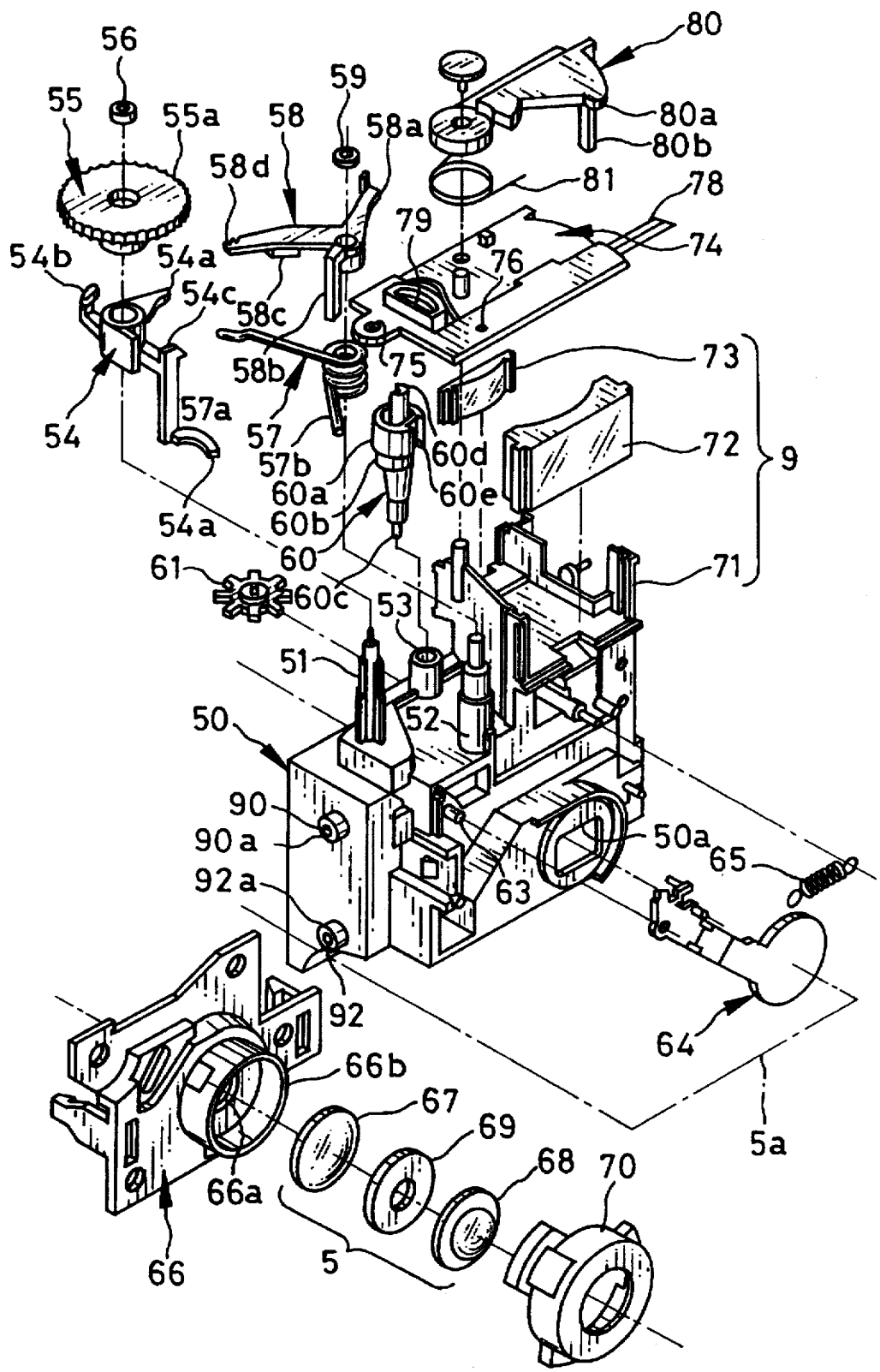
FIG. 5 is an exploded perspective view of a photograph taking unit of the embodiment shown in FIG. 2.

As shown in FIG. 5, the photograph-taking unit 17 is formed integrally with a light-shielding box 50 for conducting light from the taking lens 5 to the exposure aperture 21 and shielding extraneous light. On the top of the light-shielding box 50, two axles 51 and 52 and a bearing sleeve 53 are integrally formed therewith. A shutter actuating lever 54 and a frame counter dial 55 are rotatably fitted on the axle 51, and a snap ring 56 retains them on the axle 51. A coiled spring 57 and an arresting lever 58 are rotatably fitted on the axle 52, and a snap ring 59 secures the spring 57 and the arresting lever 58 to the axle 52. The tips of the axles 51 and 52 protrude slightly from the snap ring 56 and 58.

The bearing sleeve 53 receives a cam unit 60 which is an integral member constituted of a film stop cam 60a, a shutter cocking cam 60b, a bottom shaft 60c and a one-tooth gear 60d disposed on the top of the cam unit 60. The bottom shaft 60c is coaxially coupled to a sprocket wheel 61 which is disposed inside the light-shielding box 50. The sprocket wheel 61 engages with perforations of the photographic film 24a and makes one revolution while the photographic film 24a is advanced one frame by rotating the film advancing wheel 8. The one-tooth gear 60d meshes with one of teeth 55a formed around the periphery of the frame counter dial 55.

The shutter cocking cam 60b contacts with one end 54a of the shutter actuating lever 54. Another end 54b of the shutter actuating lever 54 is engaged with one end 57a of the coiled spring 57, which urges the shutter actuating lever 54 to rotate about the axle 51 in the counterclockwise direction. Another end 57b of the coiled spring 57 is engaged with a downward arm 58b of the arresting lever 58, to urge the arresting lever to rotate about the axle 52 in the clockwise direction. When the sprocket wheel 61 is rotated along with the film advance, the shutter cocking cam 60b causes the shutter actuating lever 54 to rotate clockwise against the force of the coiled spring 57.

The film stop cam 60a has a groove 60e formed on the periphery thereof. Each time the photographic film 24a has advanced by one frame amount, the groove 60e traps a claw 58a of the arresting lever 58, so that the sprocket wheel 61 is locked to stop the photographic film 24a from advancing. When the claw 58a of the arresting lever 58 is trapped in the groove 60e of the film stop cam 60a, the arresting lever 58 slightly rotates in the clockwise direction, so that a downward projection 58c of the arresting lever 58 is brought into engagement with an upward projection 54c of the shutter actuating lever 54c. As a result, the shutter actuating lever 54 is arrested in a cocked position. Simultaneously, another claw 58d of the arresting lever 58 is engaged with one of grooves formed around the periphery of the film advancing wheel 8. One revolution of the sprocket wheel 61 causes the cam unit 60 to make one revolution, and thus causes the frame counter dial 55 to rotate by one unit through the one-tooth gear 60d.

Upon depression of the shutter button 6, the arresting lever 58 is rotated counterclockwise about the axle 52, so that the downward projection 58c of the arresting lever 58 is disengaged from the upward projection of the shutter actuating lever 54. Then, the shutter actuating lever 54 rotates counterclockwise about the axle 51 under the force of the coiled spring 57, to strike a shutter blade 64 at a distal end 54d of the shutter actuating lever 54.

The shutter blade 64 is pivotally mounted on an axle 63 which is integrally formed on the front of the light-shielding box 50 parallel to the optical axis 5a of the taking lens 5. The shutter blade 64 is urged by a spring 65 to a closed position to close an opening 50a formed coaxially with the optical axis 5a in the light-shielding box 50, and is swung to an open position to open the opening 50a when struck by the shutter actuating lever 54.

A shutter cover 66 is mounted in front of the shutter blade 64 to prevent the shutter blade 64 from fluttering in the direction of the optical axis 5a. The shutter cover 66 has a stop aperture 66a and a lens barrel 66b around the stop aperture 66a, which are integrally formed as one body. After the taking lens 5 consisting of rear and front lens elements 67 and 68 and a spacer 69 inserted between these lens elements 67 and 68 is mounted in the lens barrel 66b, a lens cover 70 is fitted on the lens barrel 66b.

A channel-shape finder lens frame 71 for removably receiving objective lens 72 and eyepiece 73 of the viewfinder 9, an inverted Galilean viewfinder in this instance, is integrally formed on an upper portion of the light-shielding box 50. A finder lens holding plate 74 is removably mounted on the top of the finder lens frame 71 to hold the lenses 72 and 73. These lenses 72 and 73 are disposed between the finder objective window 37 of the front cover 18 and an eyepiece window 75 which is formed in the rear cover 15.

Figure 6:
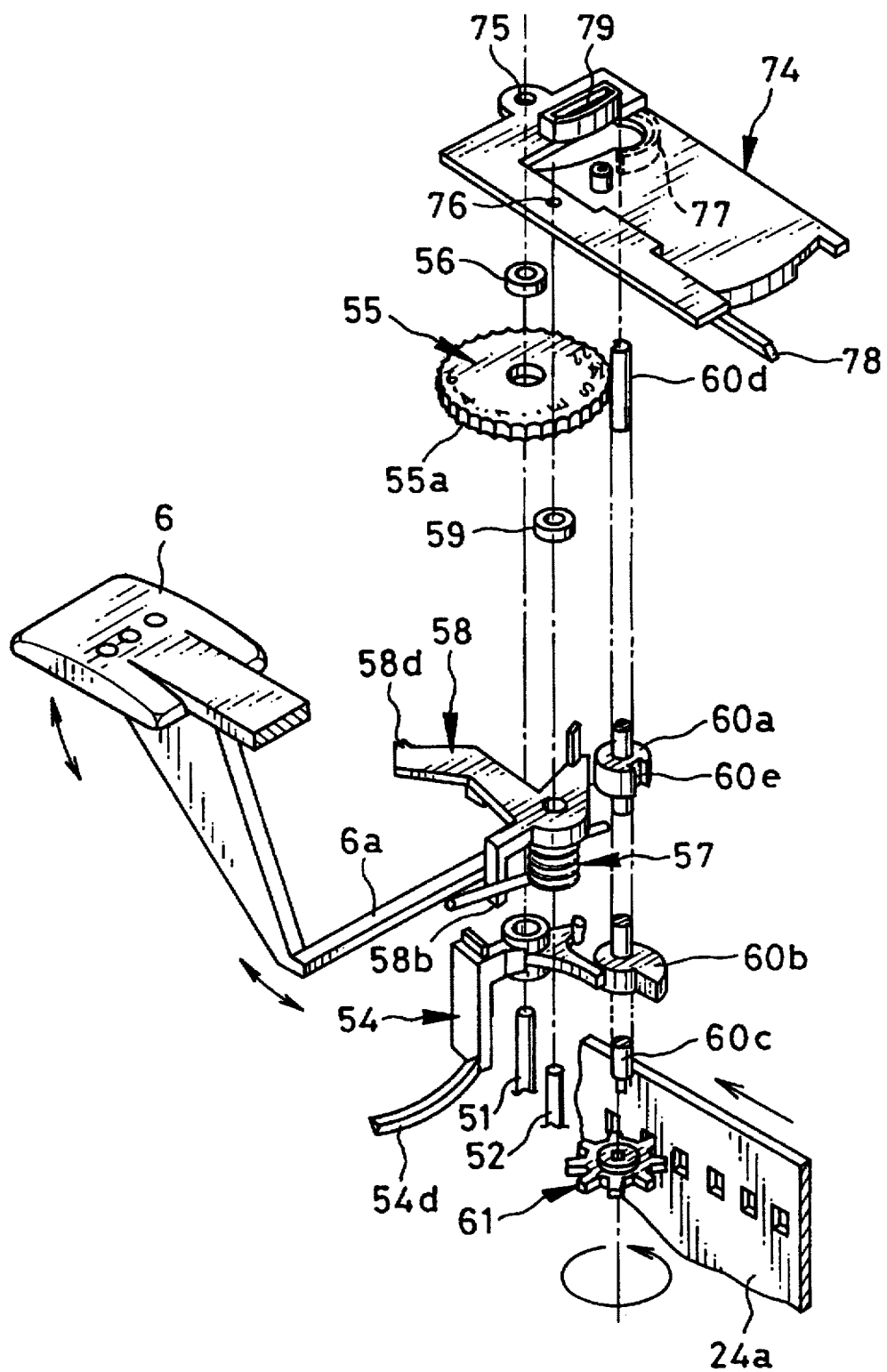
FIG. 6 is an exploded perspective view illustrating the relationship between the finder lens holding plate and the frame counting-advancing mechanism and the shutter mechanism shown in FIG. 5.

As shown in FIG. 6, the finder lens holding plate 74 is made of a transparent plastic material, and has holes 75 and 76, an arched wall 77, a light guide 78 and a convex lens portion 79 integrally formed therewith. The holes 75 and 76 accept the axles 51 and 52, respectively, and the arched wall 77 contacts an upper peripheral surface of the cam unit 60 so as to rotatably support the cam unit 60. Thereby, the spacing between the axles 51 and 52 and the cam unit 60 are maintained unchanged.

Figure 7:
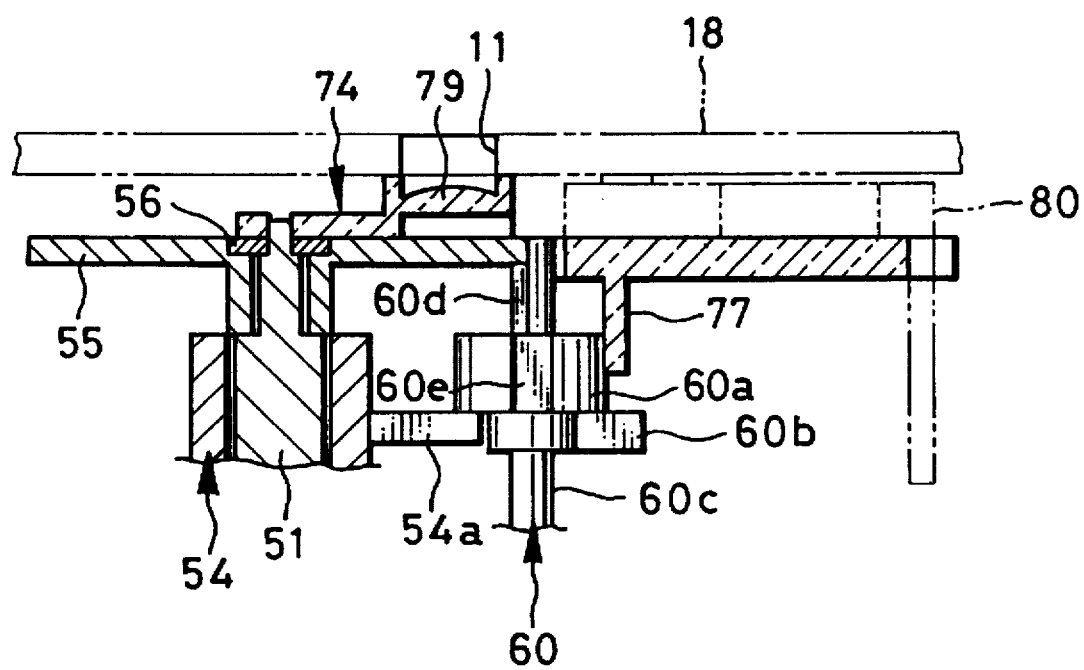
FIG. 7 is an enlarged sectional view illustrating the relationship between the finder lens holding plate and the frame counter dial and the one-teeth gear shown in FIG. 7.
Figure 8:
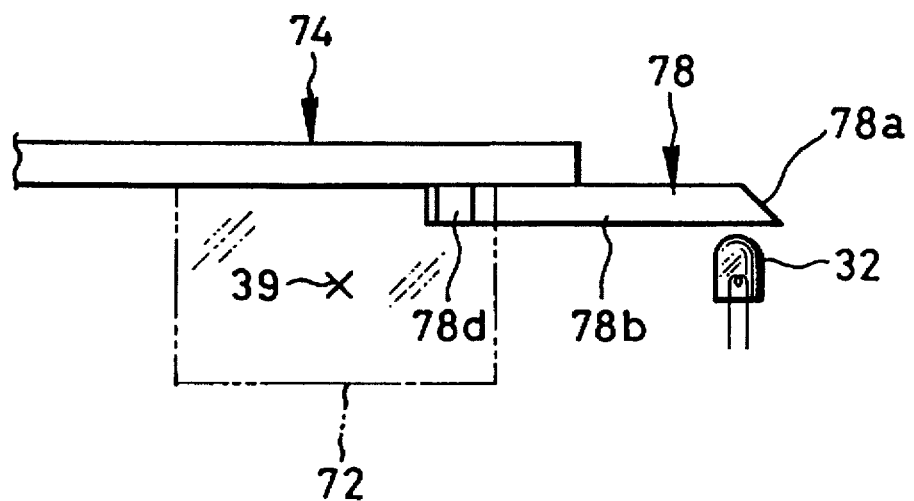
FIG. 8 is an explanatory view illustrating the relationship between the finder lens holding plate and the flash charge lamp.
Figure 9:
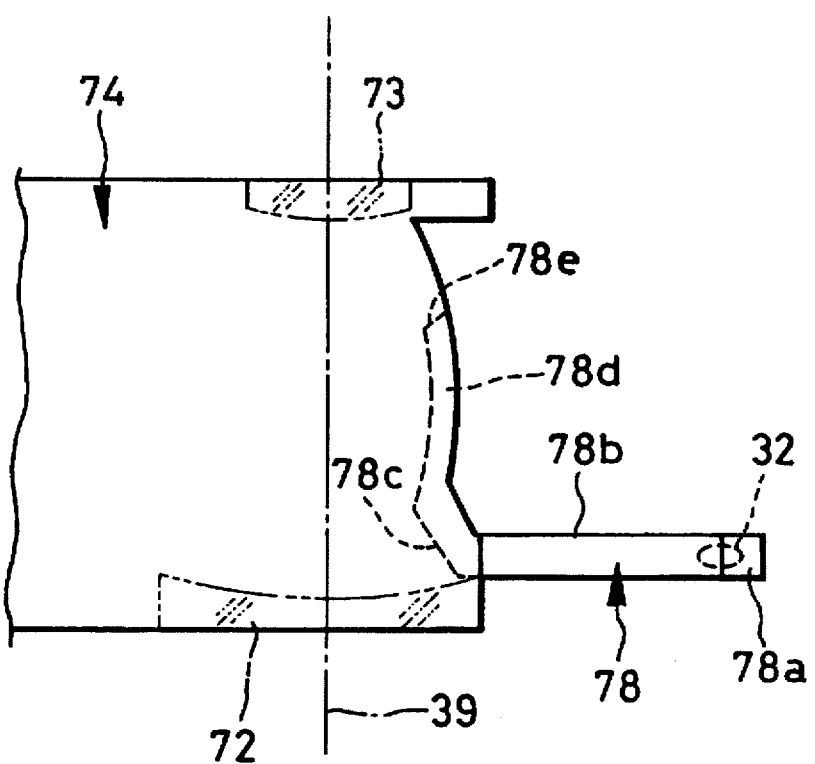
FIG. 9 is a partially cutaway top plan view of the finder lens holding plate.

As shown in detail in FIG. 7, the convex lens portion 79 is disposed above one of a plurality of frame number markings provided on the top surface of the frame counter dial 55, so as to enlarge the marking to be seen through the frame number window 11. As shown in FIGS. 8 and 9, the light guide 78 extends over the charge lamp 32 of the flash unit 16, for guiding the light from the charge lamp 32 to the field of view of the viewfinder 9. The light from the charge lamp 32 is reflected from a first inclined surface 78a formed at the tip of the light guide 78, to be conducted through a straight passage 78b toward a second inclined surface 78c. The light reflected from the second inclined surface 78c is conducted through a curved passage 78d to a third inclined surface 78e. As a result, the light from the charge lamp 32 can be viewed through the eyepiece 73 at the upper left corner of the field of view of the viewfinder 9.

Figure 10:
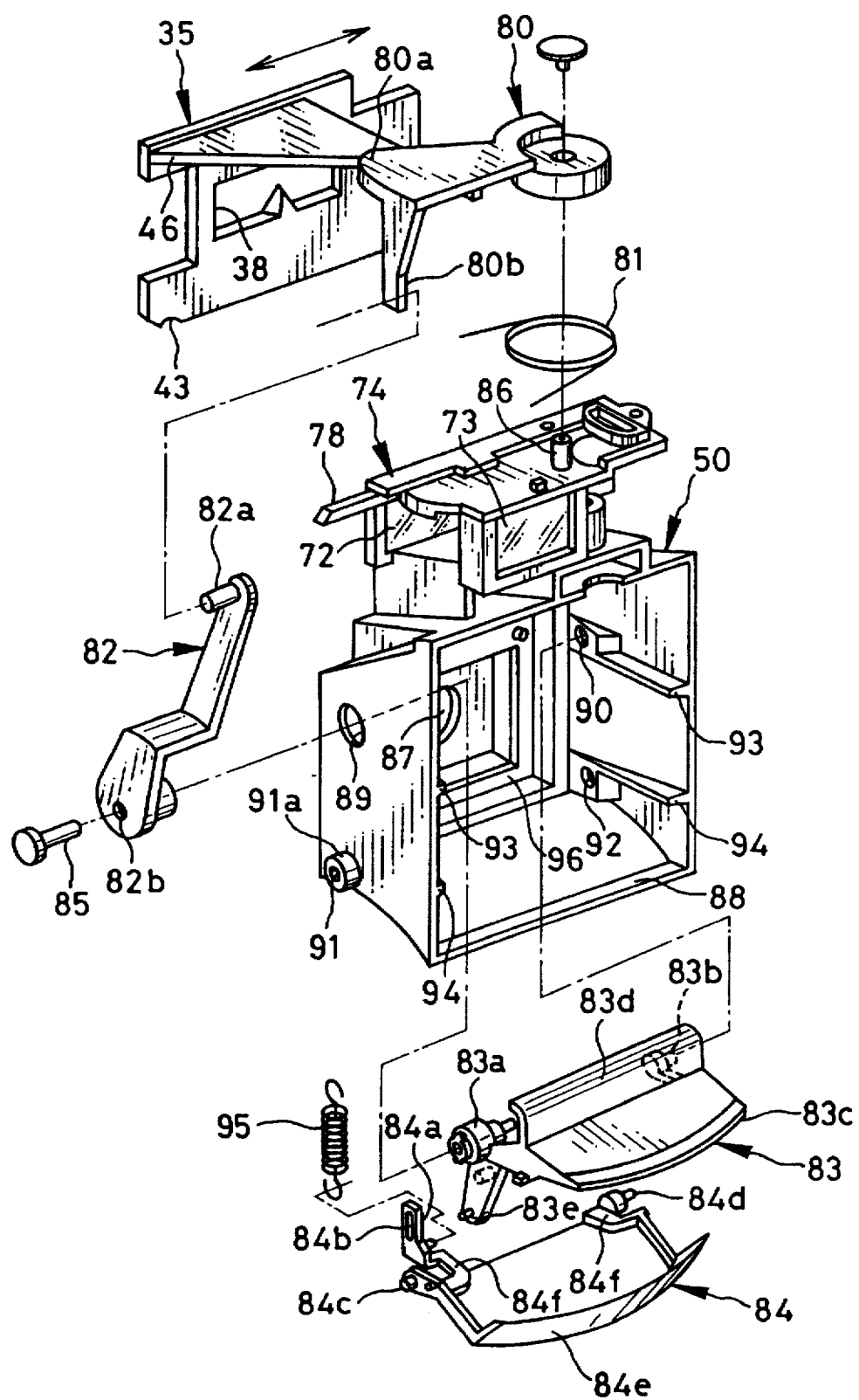
FIG. 10 is an exploded perspective view of a frame size changing mechanism of the embodiment shown in FIG. 2.

Referring to FIG. 10, the frame size changing mechanism is mainly comprised by an interconnection lever 80, a spring 81, a crank lever 82, upper and lower aperture masking plates 83 and 84 and a spring 95 suspended between these aperture masking plates 83 and 84. The interconnection lever 80 is pivotal about an axle 86 which is provided on the top surface of the finder lens holding plate 74. The interconnection lever 80 has a projection 80a which may slide on the cam 46 of the finder mask 35. The spring 81 urges the interconnection lever 80 to rotate in a direction to contact the projection 80a with the cam 46, that is, the clockwise direction in FIG. 10. The interconnection lever 80 also has an arm 80b projecting downward to engage with a pin 82a formed at an upper end of the crank lever 82.

The crank lever 82 is provided with a bearing portion 82b at a lower end thereof. The bearing portion 82b pivotally bears the upper aperture masking plate 83 through a bearing hole 89 of the light-shielding box 50. The bearing portion 82b is secured to the upper aperture masking plate 83 by a force fit pin 85.

The bottom wall of the light-shielding box 50 is curved complementarily to the contour of the cylindrical battery 28 disposed therebelow. The light-shielding box 50 has front and rear openings 87 and 88 for the passage of the exposure light. The rear opening 88 is aligned with the exposure aperture 21. A second bearing hole 90 for bearing the upper aperture masking plate 83 is formed on the side of the light-shielding box 50 opposite the bearing hole 89 so as to allow pivoting of the upper aperture masking plate 83. Another pair of bearing holes 91 and 92 are formed correspondingly below the bearing holes 89 and 90, for bearing the lower aperture masking plate 84.

The upper aperture masking plate 83 has a pair of pivots 83a and 83b on opposite horizontal sides of its front end portion. A rear edge 83c of the upper aperture masking plate 83 has a curve which is complementary to the curvature of the film supporting surface 25. A gap is formed between the pivots 83a and 83b so that the pivots 83a and 83b can be snapped in the bearing holes 89 and 90 by resiliently inwardly deforming the upper aperture masking plate 83. A blocking wall 83d for blocking light entering through the gap is formed between the gap and the rear edge 83c.

Figure 11A:
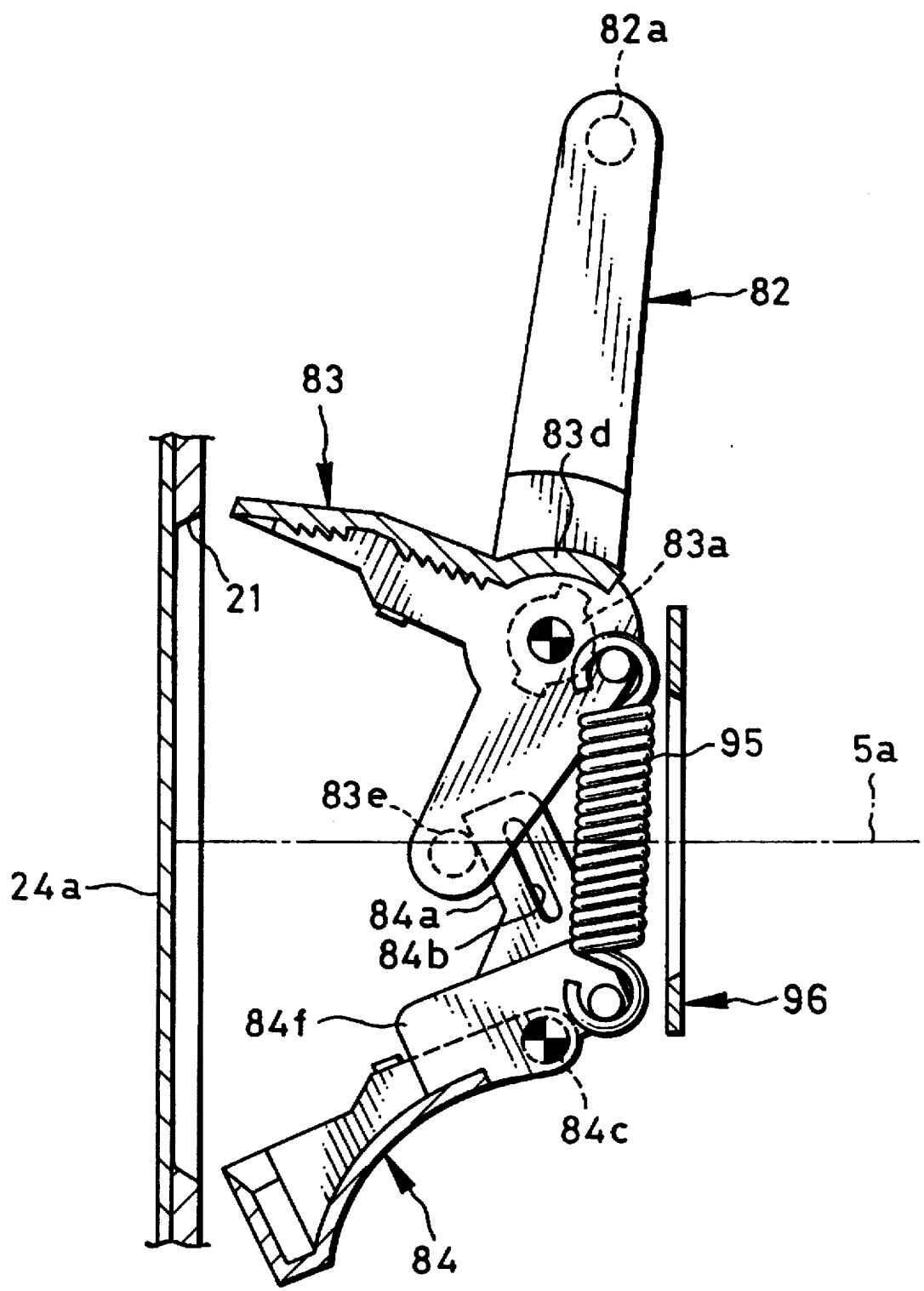
FIG. 11A is a diagram illustrating a full size position of the frame size changing mechanism shown in FIG. 10.
Figure 11B:
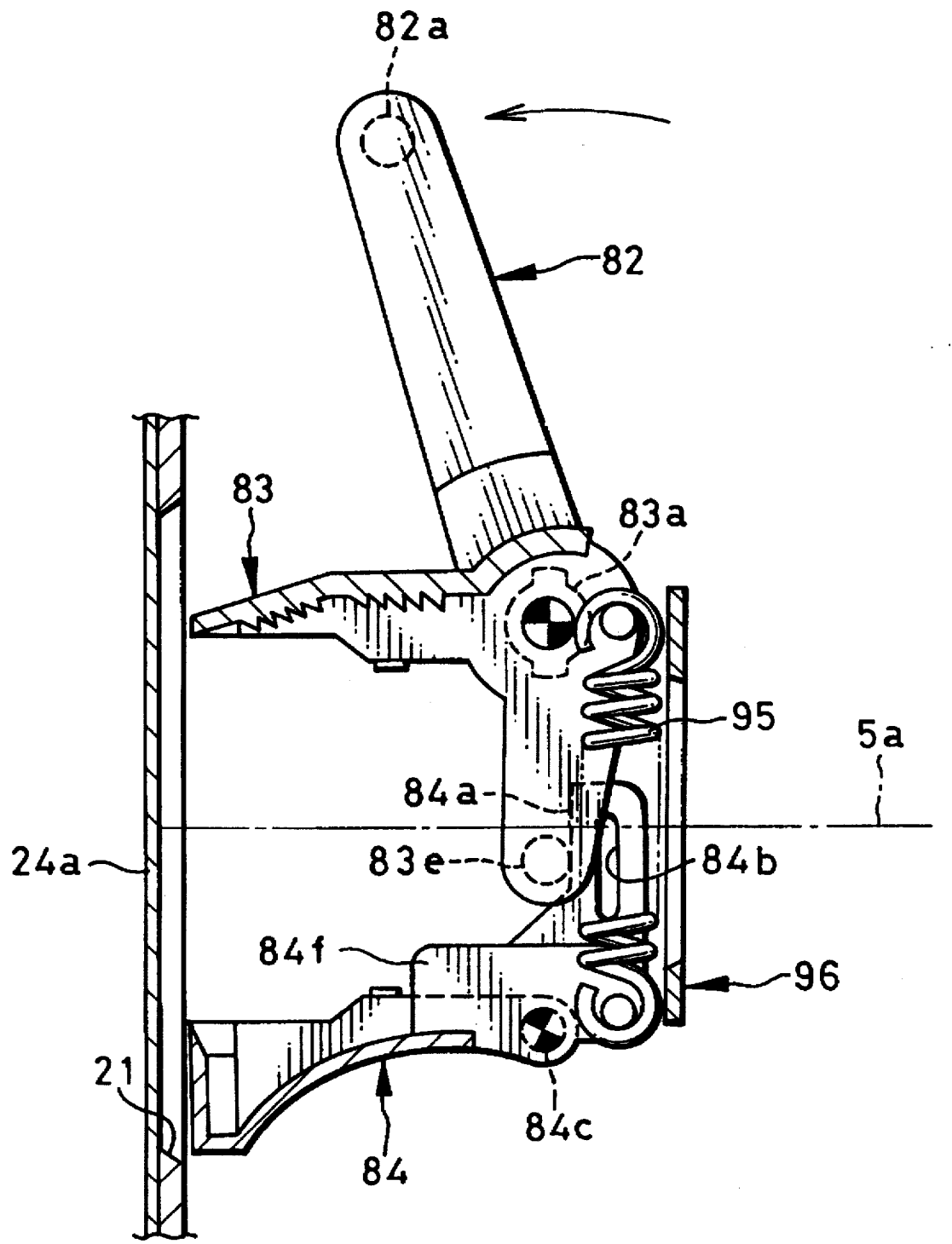
FIG. 11B is a diagram illustrating a panoramic size position of the frame size changing mechanism shown in FIG. 10.

The upper masking plate 83 has a pin 83e for transmitting the motion of the crank lever 82 to the lower masking plate 84. The lower masking plate 84 has a pair of pivots 84c and 84d on opposite horizontal sides of its front end portions. A cut-out is formed behind either pivot 84c, 84d so that the pivots 84c and 84d can be snapped in the bearing holes 91 and 92. The spring 95 urges the upper and lower masking plate 83 and 84 in a direction to contact an arm 84a of the lower masking plate 84 with the pin 83e, that is, the direction toward their full size position, shown in FIG. 11A. According to this construction, the lower masking plate 84 can pivotally move in cooperation with the upper masking plate 83 between the full size position and a panoramic position where the masking plates 83 and 84 are inserted into the exposure light path, as is shown in FIG. 11B. A slot 84b is formed through the arm 84a of the lower masking plate 84 so as to receive pressure transmitted from the pin 83e to the arm 84a. A light-trapping frame 96 for preventing flare effect in the full size position of the aperture masking plates 83 and 84 is mounted inside the light-shielding box 50.

The lower aperture masking plate 84 is curved correspondingly to the bottom wall of the light-shielding box 50 for reliably preventing internal reflection. The lower aperture masking plate 84 has a flange 84e which extends perpendicularly upwardly from the main portion of the masking plate 84, and is curved correspondingly to the film supporting surface 25. Blocking walls 84f are formed to cover the cut-outs behind the pivots 84c and 84d for blocking extraneous light entering through the cut-outs. It is to be noted that the exposure mechanism 20 are omitted from FIG. 6, for clarity.

To maintain the manufacturing cost of the film unit 2 as low as possible, most parts of the film unit are made from plastic resin. The light-shielding box 50 is also molded from plastic resin. In view of the cost of the molds, it is desirable to form the bearing holes 89 to 92 through the side walls of the light-shielding box 50. However, extraneous light would enter through the bearing holes 90 and 92 even when the pivots 83b, 84c and 84d are fitted therein. It is possible to form the bearing holes 90 to 92 as cavities having open ends merely inside the light-shielding box 50. For this construction, however, it is necessary to provide cores which can be slidably retracted from those positions which correspond to the cavities. Thus, the molds for this construction should be complicated, and the cores should be precisely positioned and moved. Therefore, the manufacturing cost cannot be low.

To solve the just described problem, annular bosses 90a, 91a and 92a are respectively formed around the bearing holes 90, 91 and 92 on the outside wall of the light-shielding box 50 (see FIG. 5), so as to reliably shield extraneous light from entering through the bearing holes 90 to 92. Two pairs of stops 93 and 94 are formed integrally on the inside of the side walls of the light-shielding box 50 in those positions corresponding to the bearing holes 90 to 92, so as to stop the aperture masking plates 83 and 84 in their panoramic position.

Figure 12:
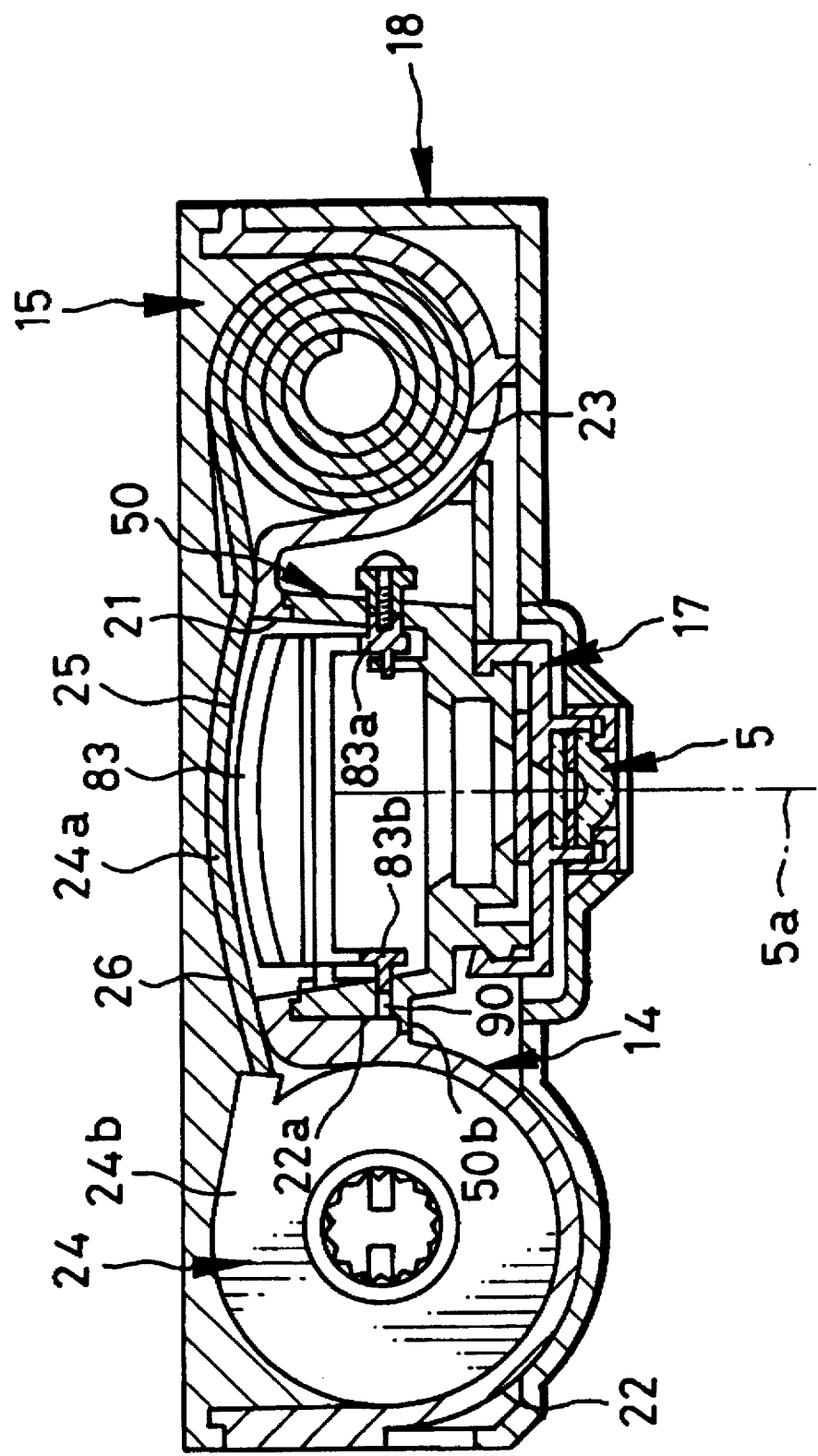
FIG. 12 is a horizontal sectional view of a film unit according to another preferred embodiment of the present invention.
Figure 13:
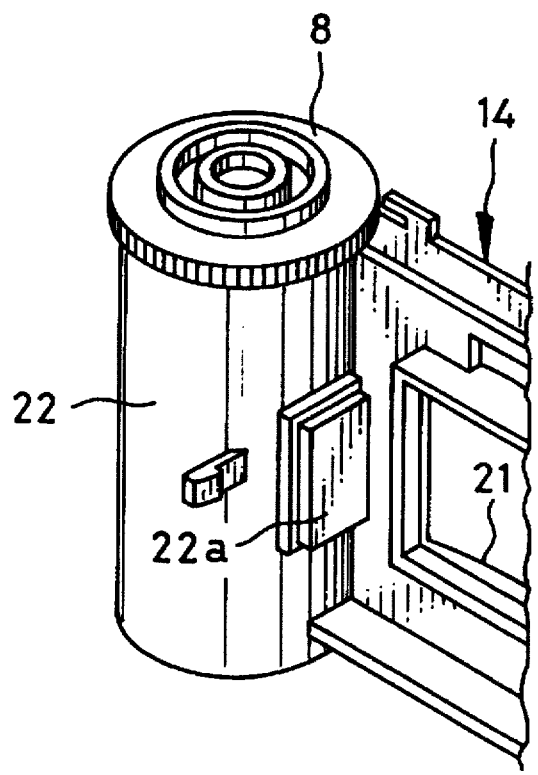
FIG. 13 is a partially cutaway perspective view of the basic body of the embodiment shown in FIG. 12.
Figure 14:
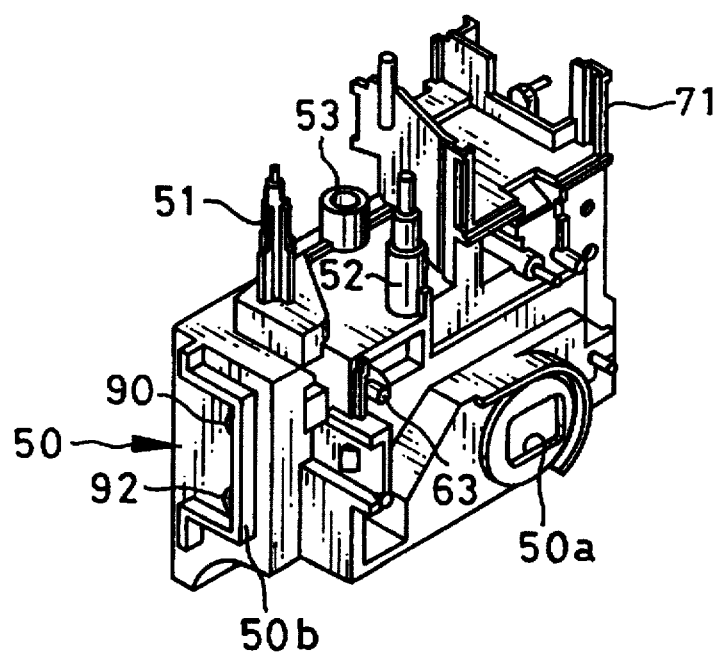
FIG. 14 is a perspective view of the photograph taking unit of the embodiment shown in FIG. 12.

In place of providing the annular bosses 90a, 91a and 92a, it is possible to shield the bearing holes 90 to 92 from outside by covering with outer wall portions of the cassette chamber 22 and the film roll chamber 23, as is shown in FIGS. 12 to 14, with respect to the bearing holes 90 and 92. That is, the cassette chamber 22 is integrally formed with a portion 22a protruding toward the side wall of the light-shielding box 50 having the bearing holes 90 and 92, as is shown in FIG. 13, whereas the light-shielding box 50 is integrally formed with a ridge 50b which may be fit on the periphery of the protruding portion 22a, preferably in a labyrinthian fashion. Thereby, extraneous light is unfailingly blocked from entering through the bearing holes 90 and 92. As for the bearing hole 91, the same light-shielding construction may be applicable. This embodiment can also be inexpensive because it is unnecessary to increase the number of parts of the film unit.

The operation of the above-described film unit 2 are as follows:

To get ready to photograph, the film advancing wheel 8 is rotated to advance the photographic film 24a. Because teeth of the sprocket wheel 61 are engaged in perforations of the photographic film 24a, the sprocket wheel 61 is rotated in the counterclockwise direction of FIG. 5 by the advance of the photographic film 24a. Thereby, the shutter actuating lever 54 is rotated clockwise through the shutter cocking cam 60b. When the photographic film 24a has been advanced one frame amount, the claw 58a of the arresting lever 58 is caught in the groove 60e, to stop the rotation of the sprocket wheel 61 and the winding of the photographic film 24a as well. Since the arresting lever 58 slightly rotates in the clockwise direction at that time, the downward projection 58c of the arresting lever 58 is engaged with the upward projection 54c of the shutter actuating lever 54, so that the shutter actuating lever 54 is held in the cocked position. Simultaneously, one revolution of the sprocket wheel 61 causes the one-tooth gear 60d to advance the frame counter dial 55 one unit.

Although the spring 57 urges the axles 51 and 52 and the cam unit 60 to move apart from each other, the finder lens holding plate 74 holds these elements 51, 52 and 60 in predetermined positions, so that deformation of these elements 51, 52 and 60 due to the force of the spring 57 is reliably prevented even at a high temperature. Moreover, the arched wall 77 prevents the cam unit 60 from slipping off or falling down. Accordingly, the one-tooth gear 60d always causes the frame counter dial 55 to advance one unit per one revolution of the sprocket.

After cocking the shutter actuating lever by rotating the film advancing wheel, the photographer may depress the charge switch 7 while framing a photographic field through the viewfinder 9, so as to charge the main capacitor 31 of the flash unit 16 to a high voltage with the battery 28. When the main capacitor 31 has been charged up to the high voltage, the charge lamp 32 starts emitting intermittently. The intermittent light from the charge lamp 32 is reflected from the first inclined surface 78a of the light guide 78, and is conducted through the straight passage 78b toward the second inclined surface 78c. The light reflected from the second inclined surface 78c is conducted through the curved passage 78d to the third inclined surface 78e. As a result, the light from the charge lamp 32 can be viewed through the eyepiece 73 at the upper left corner of the field of view of the viewfinder 9, so that the photographer can confirm the completion of charging during the framing.

Upon depression of the shutter button 6, a leg 6a extending downward from the shutter button 6 pushes the arm 58b of the arresting lever 58 to rotate the same in the counterclockwise direction. As a result, the downward projection 58c is disengaged from the upward projection 54c, so that the shutter actuating lever 54 rotates counterclockwise under the force of the spring 57. The distal end 54d of the shutter actuating lever 54 strikes the shutter blade 64 during this counterclockwise rotation, thereby causing the shutter blade 64 to swing about the axle 63 to open and then close the stop aperture 66a. Concurrently, the shutter blade 64 turns the contacts 29 on to cause the flash unit 16 to project light from the light emitting portion 27 toward a subject. Light from the subject enters through the taking lens 5 and falls on the photographic film 24a.

The film unit 2 is initially set in the panoramic position. Therefore, the field of view of the viewfinder 9 is defined by the panoramic window 38, so that the photographer can frame the photographic field in the panoramic size. When the shutter button 6 is depressed in the panoramic position, the upper and lower aperture masking plates 83 and 84 cut off upper and lower parts of the light entering through the taking lens 5, so that a panoramic size picture frame is recorded on the film 24a.

For taking a full size picture frame, the knob 3 is slid to the left of FIG. 3, that is, to the right of FIG. 10, disengaging the notch 43 of the finder mask 35 from the click 45 of the front cover 18. After the notch 43 is disengaged from the click 45, the finder mask 35 smoothly moves to the right of FIG. 10 under the force of the spring 81 which urges the interconnection lever 80 to rotate in the clockwise direction. The finder mask 35 and thus the frame size changing mechanism 19 is secured to the full size position by fitting the notch 42 on the click 44. At that time, the photographer is informed by the click that the film unit 2 is switched to the full size position.

The clockwise rotation of the interconnection lever 80 under the force of the spring 81 causes the crank lever 82 to rotate about the bearing portion 82b in the counterclockwise direction, so that the upper aperture masking plate 83 moves about the pivots 83a and 83b in the counterclockwise direction. By virtue of the spring 95, the lower aperture masking plate 95 is rotated about the pivots 84c and 84d in the clockwise direction. In this way, the upper and lower aperture masking plates 83 and 84 are set in the full size position as shown in FIG. 11A.

After switching the film unit 2 to the full size position by sliding the knob 3 as described above, the field of view of the viewfinder 9 is defined by the opening 40 of the cover panel 36 to correspond to the full size defined by the exposure aperture 21. In this position, a full size picture frame is recorded on the photographic film 24a upon depression of the shutter button 6, in the same way as above.

Photographing continues thereafter by setting the knob 3 to either the full size or the panoramic position. After all available frames have been photographed, the film unit 2 containing the exposed photographic film 24a is forwarded to a photo-lab. At the photo-lab, the photographic film cassette 24 is removed from the film unit 2. If a depiction is printed on the cassette shell 24b indicating that the photographic film 24a includes both full size frames and panoramic size frames, this cassette 24 can be easily grouped with others that should be subjected to the following special process.

After this grouping, the photographic film 24a is pulled out of the cassette shell 24b, and is developed and inspected. At the time of this film inspection, a notch is provided to each full size frame in order to discriminate between full size and panoramic size frames. Because the panoramic size picture frames are about 13×36 mm, having a less height than the full size picture frame, they are easy to detect. The photographic film 24a after inspected is set in a scanner, which first scans images of merely the full size picture frames marked with the notches, and calculates an exposure correction value for each full size picture frame. The data of exposure correction values is written in a memory card along with the associated frame numbers. Thereafter, the photographic film 24a and the corresponding memory card is set in a printer-processor to continuously make photoprints of 89×127 mm size from the full size picture frames with reference to the exposure correction value.

Next, the photographic film 24a is again set in the scanner, which then picks up image of merely the panoramic picture frames to calculate exposure correction values for the respective panoramic size picture frames, and records exposure correction data in the memory card. Then, photoprints of 89×254 mm size are continuously made from the panoramic size picture frames by the printer-processor, after the format of photographic paper and the size of paper mask are changed correspondingly. The print magnification for the full size picture frame is about 3.5, whereas that for the panoramic size picture frame is about 7. The resulting photo-prints and the developed photographic film 24a are forwarded back to the customer, and the film unit 2 containing no photographic film is recovered for recycling.

Because the finder lens holding plate 74 holds these elements 51, 52 and 60 in predetermined positions, deformation of these elements 51, 52 and 60 is reliably prevented even at a high temperature, in spite of the force of the spring 57 which urges the axles 51 and 52 and the cam unit 60 to remove apart from each other. Accordingly, the frame counting-advancing mechanism of the film unit can be rarely defective and hence mostly reusable. This contributes to prolonging the life of reusable parts of the film unit, in other words, improving reusability of the film unit.

Although the axles 51 and 52 and the finder lens frame 71 are formed integrally with the light-shielding box 50, it is possible to form the light-shielding box integrally with the main body section, while forming other stationary elements of the photograph-taking unit, such as the axles and the finder lens frame, as an integral body which may be removably attached to the front of the light-shielding box.

Although the above-described embodiments of the invention all relate to frame size changeable film units which can take full size picture frames and panoramic size picture frames, it is of course possible to apply the present invention to other kinds of film units.

While the present invention has been described wit reference to preferred embodiments shown in the drawings, the present invention is not limited by the embodiments but, on the contrary, various modifications of the present invention can be effected without departing from the scope and spirit of the appended claims.

What is claimed is:

1. In a lens-fitted photographic film unit having a pre-loaded photographic film and a photograph-taking unit on which a taking lens and finder lens elements of an optical viewfinder are mounted, said photograph-taking unit comprising:

a sprocket wheel rotatable in engagement with perforations of said photographic film;

a shutter mechanism including a shutter cocking cam rotated by said sprocket wheel, a shutter actuating lever moved by said shutter cocking cam from an initial position to a cocked position against a force of a spring, and a shutter blade actuated by said shutter actuating lever to expose said photographic film through said taking lens while said shutter actuating lever returns to said initial position under the force of said spring;

a frame counter dial having teeth formed around the periphery thereof and frame number markings on a top surface thereof for indicating the exposed or unexposed number of available picture frames;

a one-tooth gear engaged with said teeth of said frame counter dial and rotated by said sprocket wheel so as to advance said frame counter dial one unit per one rotation of said one-tooth gear, said one-tooth gear being formed integrally with said shutter cocking cam into a cam unit;

an axle for pivotally mounting said shutter actuating lever and said frame counter dial;

a plate removably secured to a top side of a finder lens frame for holding said finder lens elements; and supporting portions formed in an area of said plate, for supporting said axle and said cam unit at their upper portions so as to maintain proper engagement between said one-tooth gear and said teeth of said frame counter dial;

wherein said supporting portions comprise a hole in which an upper tip of said axle is fitted, and an arched wall contacting an upper peripheral surface of said cam unit so as to support said cam unit for rotation of said cam unit, said hole and said arched wall being formed in a bottom side of said plate in an area which extends beyond said top side of said finder lens elements.

2. A lens-fitted photographic film unit as recited in claim 1, wherein said photograph-taking unit further comprises an arresting lever for arresting said shutter actuating lever in said cocked position and simultaneously stopping said cam unit from rotating, and a second axle for pivoting said arresting lever and said spring, and the force of said spring applied to said shutter actuating lever urges said first axle, which pivots said shutter actuating lever and said frame counter dial, to remove from said cam unit relative to each other.

3. A lens-fitted photographic film unit as recited in claim 2, wherein said plate further has a second hole in which an upper tip of said second axle is fitted.

4. A lens-fitted photographic film unit as recited in claim 3, wherein said finder lens frame for holding bottom, left and right sides of said lens elements is formed from plastic resin integrally with said first and second axles, and disposed beside said axles on an upper portion of said photograph-taking unit.

5. A lens-fitted photographic film unit as recited in claim 4, wherein said cam unit is supported for rotation at its lower portion by a sleeve which is formed through said upper portion of said photograph-taking unit, and is coupled at its lower end to said sprocket wheel.

6. A lens-fitted photographic film unit as recited in claim 1, wherein said plate is made of a transparent plastic material and has a convex lens portion which is disposed above one of said frame number markings of said frame counter dial, so as to enlarge said one marking.

7. A lens-fitted photographic film unit as recited in claim 6, wherein said photograph-taking unit is removably attached to a front of an exposure aperture formed through a main body section of said lens-fitted photographic film unit, and front and top sides of said photograph-taking unit is covered with an opaque front cover, which is removably attached to said main body section and has a frame number window formed therethrough in a position above said convex lens portion.

8. A lens-fitted photographic film unit as recited in claim 1, further comprising a flash unit having a charge lamp which starts emitting when a main capacitor of said flash unit is fully charged, wherein said plate has a light guide portion for conducting light from said charge lamp to a field of view of said optical viewfinder, so as to permit checking if said main capacitor is fully charged, while framing a photographic field through said viewfinder.

9. In a lens-fitted photographic film unit having a pre-loaded photographic film and a photograph-taking unit on which a taking lens and finder lens elements of an optical viewfinder are mounted, said photograph-taking unit comprising:

a sprocket wheel rotatable in engagement with perforations of said photographic film;

a shutter mechanism including a shutter cocking cam rotated by said sprocket wheel, a shutter actuating lever moved by said shutter cocking cam from an initial position to a cocked position against a force of a spring, and a shutter blade actuated by said shutter actuating lever to expose said photographic film through said taking lens while said shutter actuating lever returns to said initial position under the force of said spring;

a frame counter dial having teeth formed around the periphery thereof and frame number markings on a top surface thereof for indicating the exposed or unexposed number of available picture frames;

a one-tooth gear engaged with said teeth of said frame counter dial and rotated by said sprocket wheel so as to advance said frame counter dial one unit per one rotation of said one-tooth gear, said one-tooth gear being formed integrally with said shutter cocking cam into a cam unit;

an axle for pivotally mounting said shutter actuating lever and said frame counter dial; and a plate for supporting said axle and said cam unit at their upper portions so as to maintain proper engagement between said one-tooth gear and said teeth of said frame counter dial;

wherein said plate comprises a hole in which an upper tip of said axle is fitted, and an arched wall contacting an upper peripheral surface of said cam unit so as to support said cam unit for rotation of said cam unit, said hole and said arched wall being formed in a bottom side of said plate.

10. A lens-fitted photographic film unit as recited in claim 9, wherein said photograph-taking unit further comprises an arresting lever for arresting said shutter actuating lever in said cocked position and simultaneously stopping said cam unit from rotating, and a second axle for pivoting said arresting lever and said spring, and the force of said spring applied to said shutter actuating lever urges said first axle, which pivots said shutter actuating lever and said frame counter dial, to remove from said cam unit relative to each other.

11. A lens-fitted photographic film unit as recited in claim 10, wherein said plate further has a second hole in which an upper tip of said second axle is fitted.

12. A lens-fitted photographic film unit as recited in claim 11, wherein a finder lens frame for holding bottom, left and right sides of said lens elements is formed from plastic resin integrally with said first and second axles, and disposed beside said axles on an upper portion of said photograph-taking unit.

13. A lens-fitted photographic film unit as recited in claim 12, wherein said cam unit is supported for rotation at its lower portion by a sleeve which is formed through said upper portion of said photograph-taking unit, and is coupled at its lower end to said sprocket wheel.

14. A lens-fitted photographic film unit as recited in claim 9, wherein said plate is made of a transparent plastic material and has a convex lens portion which is disposed above one of said frame number markings of said frame counter dial, so as to enlarge said one marking.

15. A lens-fitted photographic film unit as recited in claim 14, wherein said photograph-taking unit is removably attached to a front of an exposure aperture formed through a main body section of said lens-fitted photographic film unit, and front and top sides of said photograph-taking unit is covered with an opaque front cover, which is removably attached to said main body section and has a frame number window formed therethrough in a position above said convex lens portion.

16. A lens-fitted photographic film unit as recited in claim 9, further comprising a flash unit having a charge lamp which starts emitting when a main capacitor of said flash unit is fully charged, wherein said plate has a light guide portion for conducting light from said charge lamp to a field of view of said optical viewfinder, so as to permit checking whether said main capacitor is fully charged, while framing a photographic field through said viewfinder.

17. In a lens-fitted photographic film unit having a pre-loaded photographic film and a photograph-taking unit on which a taking lens and finder lens elements of an optical viewfinder are mounted, said photograph-taking unit comprising:

a sprocket wheel rotatable in engagement with perforations of said photographic film;

a shutter mechanism including a shutter cocking cam rotated by said sprocket wheel, a shutter actuating lever moved by said shutter cocking cam from an initial position to a cocked position against a force of a spring, and a shutter blade actuated by said shutter actuating lever to expose said photographic film through said taking lens while said shutter actuating lever returns to said initial position under the force of said spring;

a frame counter dial having teeth formed around the periphery thereof and frame number markings on a top surface thereof for indicating the exposed or unexposed number of available picture frames;

a gear engaged with said teeth of said frame counter dial and rotated by said sprocket wheel so as to advance said frame counter dial one unit per one frame of said photographic film, said gear being formed integrally with said shutter cocking cam into a cam unit;

said gear rotating through a predetermined angle upon advance of said film by one frame, said gear having one tooth in a same predetermined position each rotation of said gear through said predetermined angle;

an axle for pivotally mounting said shutter actuating lever and said frame counter dial;

a plate removably secured to a top side of a finder lens frame for holding said finder lens elements; and supporting portions formed in an area of said plate, for supporting said axle and said cam unit at their upper portions so as to maintain proper engagement between said gear and said teeth of said frame counter dial;

wherein said supporting portions comprise a hole in which an upper tip of said axle is fitted, and an arched wall contacting an upper peripheral surface of said cam unit so as to support said cam unit for rotation of said cam unit, said hole and said arched wall being formed in a bottom side of said plate in an area which extends beyond said top side of said finder lens elements.

18. In a lens-fitted photographic film unit having a pre-loaded photographic film and a photograph-taking unit on which a taking lens and finder lens elements of an optical viewfinder are mounted, said photograph-taking unit comprising:

a sprocket wheel rotatable in engagement with perforations of said photographic film;

a shutter mechanism including a shutter cocking cam rotated by said sprocket wheel, a shutter actuating lever moved by said shutter cocking cam from an initial position to a cocked position against a force of a spring, and a shutter blade actuated by said shutter actuating lever to expose said photographic film through said taking lens while said shutter actuating lever returns to said initial position under the force of said spring;

a frame counter dial having teeth formed around the periphery thereof and frame number markings on a top surface thereof for indicating the exposed or unexposed number of available picture frames;

a gear engaged with said teeth of said frame counter dial and rotated by said sprocket wheel so as to advance said frame counter dial one unit per one frame of said photographic film, said gear being formed integrally with said shutter cocking cam into a cam unit;

said gear rotating through a predetermined angle upon advance of said film by one frame, said gear having one tooth in a same predetermined position each rotation of said gear through said predetermined angle;

an axle for pivotally mounting said shutter actuating lever and said frame counter dial;

a plate for supporting said axle and said cam unit at their upper portions so as to maintain proper engagement between said gear and said teeth of said frame counter dial;

wherein said supporting portions comprise a hole in which an upper tip of said axle is fitted, and an arched wall contacting an upper peripheral surface of said cam unit so as to support said cam unit for rotation of said cam unit, said hole and said arched wall being formed in a bottom side of said plate in an area which extends beyond said top side of said finder lens elements.

\* \* \* \* \*